United States Patent [19]

Voss et al.

[11] 4,412,145
[45] Oct. 25, 1983

[54] STATOR FOR AN ELECTRIC MACHINE EXCITED BY PERMANENT MAGNETS

[75] Inventors: Erich Voss; Horst Gräfenschnell, both of Bad Neustadt, Fed. Rep. of Germany

[73] Assignee: Siemens Aktiengesellschaft, Munich, Fed. Rep. of Germany

[21] Appl. No.: 343,111

[22] Filed: Jan. 27, 1982

[30] Foreign Application Priority Data

Feb. 16, 1982 [DE] Fed. Rep. of Germany ....... 3105602

[51] Int. Cl.³ ............................................. H02K 21/26
[52] U.S. Cl. ............................ 310/154; 310/40 MM; 310/255
[58] Field of Search .............. 310/154, 25 A, 40 MM

[56] References Cited

U.S. PATENT DOCUMENTS

| | | | |
|---|---|---|---|
| 3,090,877 | 5/1963 | Baumhart | 310/154 |
| 3,450,907 | 6/1969 | Blume | 310/154 X |
| 3,631,277 | 12/1971 | Ferdig et al. | 310/154 |

FOREIGN PATENT DOCUMENTS

| | | | |
|---|---|---|---|
| 2005194 | 8/1971 | Fed. Rep. of Germany.. | 310/40 MM |
| 1477233 | 4/1967 | France | 310/154 |
| 1170228 | 11/1969 | United Kingdom . | |

Primary Examiner—Mark O. Budd
Attorney, Agent, or Firm—Kenyon & Kenyon

[57] ABSTRACT

Arcuate permanent magnets are inserted into the bore hole of a stator intended for use in an electric machine which is excited by permanent magnets. Spring elements, inserted into recesses in the wall of the bore between the magnets, have spring arms which are connected to each other via a back part and which rest against axially extending lateral edges of the permanent magnets. To insure retention of the permanent magnets against high mechanical shock stresses without connecting the spring elements to the stator, the spring elements are provided with extensions, formed on their back parts, which frictionally engage undercuts in the recesses. The spring arms themselves extend around the lateral edges of the permanent magnets in a form-locking manner.

3 Claims, 5 Drawing Figures 4,412,145

1

STATOR FOR AN ELECTRIC MACHINE EXCITED BY PERMANENT MAGNETS

BACKGROUND OF THE INVENTION

This invention relates to a stator for use in an electric machine which is excited by permanent magnets. More particularly, the invention relates to a stator having a bore hole into which arcuate permanent magnets are inserted, there being spring retaining elements inserted between the magnets which are fastened to the stator and rest against lateral edges of the magnets. The spring elements have spring arms which are connected together via a back part.

A stator of this general type is described in GB-PS 1 170 228, and has spring elements which are fastened to the stator by rivets. The spring arms of the spring elements rest against the lateral edges of the (shell-shaped) permanent arcuate magnets. The known stator is of two-pole design and therefore has two arcuate magnets which extend over a large circular arc. With this geometric configuration the magnets are held securely by the spring elements in spite of hard mechanical shocks, since the shocks only result, as a practical matter, in forces which act in the circumferential direction on the spring elements. The spring elements are secured against these forces by rivets.

In stator designs having more poles, for instance four or more poles, the permanent magnets extend over substantially smaller arcs, with the result that shocks stress the spring elements heavily in the radial direction.

It is an object of the present invention to design a stator for an electric machine excited by permanent magnets in such a way that secure fastening of the arcuate permanent magnets is insured in the event of hard shock stresses, while the spring elements are held securely at the stator without fasteners, the fasteners being capable of separate installation so as to simplify the assembly.

SUMMARY OF THE INVENTION

According to the present invention, the problem set forth above is solved by providing spring elements, each of which has a pair of extensions formed on its back part, which engage in the undercuts of channels provided in the circumference of the stator bore. The spring elements have spring arms which reach around and conformably and positively lock on axially extending, lateral edges of the magnets. The engagement of an extension of the spring element in each undercut insures that the spring element is securely held in the stator in the radial as well as the circumferential direction. Due to the conformable locking cooperation of the spring arms around the edges of the magnets, the magnets are, likewise, well secured against forces acting in the radial or circumferential direction.

Particularly simple installation of the spring elements is achieved by providing channels for receiving the extensions which extend to and are open at at least one end face of the stator, so that the spring elements can be pushed into the channels from that end face. This is especially advantageous for automated production.

A mechanical design which is particularly advantageous for axial insertion of the spring elements is obtained when the channels are slots which are dove-tail or T-shaped and the extensions are formed from the spring as punched-out and bent-up tabs. Furthermore, each spring arm can have an axially extending notch by which one of the pointed axially extending lateral edges of the magnets is conformably engaged.

DETAILED DESCRIPTION OF THE INVENTION

Figure 1:
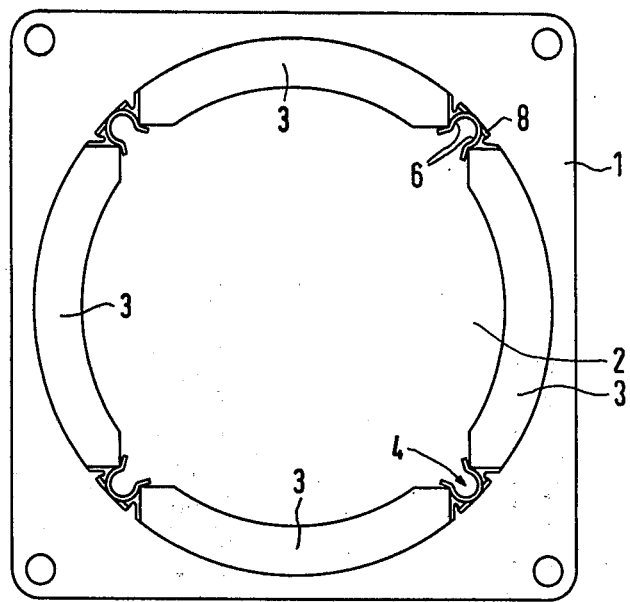
FIG. 1 is a view, in cross-section, of the stator of an electric machine which has arcuate magnets which are held in place in accordance with the teachings of this invention.

In FIG. 1 the stator of an electric machine excited by permanent magnets is marked 1. Stator 1 has a stator bore 2, into which four arcuate permanent magnets 3 are inserted. Spring retainer elements 4 are inserted between the permanent magnets.

Figures 2, 3:
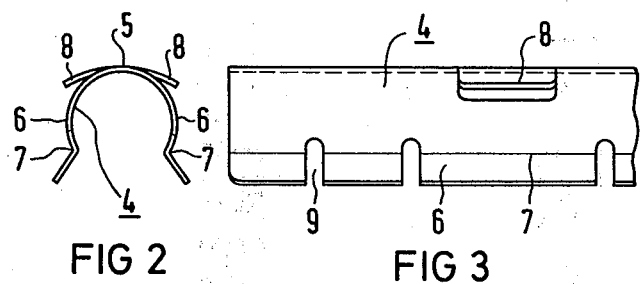
FIG. 2 is an end view of the spring element used in FIG. 1 for holding two of the arcuate magnets in place.
FIG. 3 is a side view of the spring element of FIG. 1.

As may be better seen in FIGS. 2 and 3, each spring element 4 has two spring arms 6 which are connected to each other via back part 5 of the spring. Each spring arm has a notch or crease 7 formed in the metal which extends in the axial direction, e.g., parallel to the axis of the machine. Extensions 8 are formed on back part 5, being tabs which are punched out of the metal of the back part and bent up away from the body of the spring element. Each spring element 4 has one or more cuts 9 in the spring arms by which the elasticity of the arms is influenced.

Figures 4, 5:
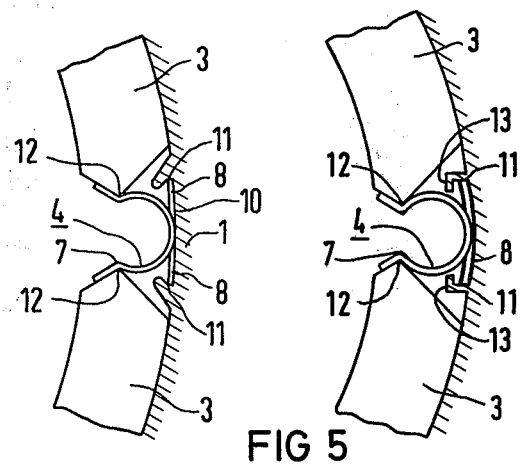
FIG. 4 is a side view showing details of the arrangement of the spring element in a dovetail slot.
FIG. 5 is a side view of a spring element in a T-shaped slot.

As shown in detail in FIG. 4, each of the four channels or slots 10, provided at the circumference of the stator bore, has dovetail undercuts 11. The extensions 8 of each spring element 4 extend into and engage these undercuts, and the spring elements are thus secure in the slots in the radial as well as in the circumferential direction. Each lateral end of each permanent magnet 3 has an axially extending edge or point 12 which fits into and engages the respective notch 7 of spring element 4 and results in a positively locked connection between the permanent magnets 3 and the associated spring arms 6 by which the spring elements 4 hold the magnets against motion in the radial as well as in the circumferential direction. Spring elements 4 can be inserted into channels 10 from the end face. FIG. 5 shows an arrangement in which extensions 8 of spring element 4 are received in a T-shaped slot arrangement, having undercuts 11 which are formed by inverted "L"s 13 and which constitute the top of the T-shaped slot in which the extensions 8 of a spring clip 4 are received.

What is claimed is:

1. A stator for use in an electric machine which is excited by permanent magnets, the stator having a bore hole with a circumference and an end face and further comprising:
   a plurality of channels at the circumference of the bore hole, each channel having at least two undercuts, said channels extending to and open on the end face;
   a plurality of arcuate permanent magnets, each magnet positioned in the bore hole between adjacent channels and each magnet having axially extending lateral edges; and a spring element in each channel, each spring element having a back part and extensions formed on the back part, each extension engaging an undercut of the respective channel, and each spring element having at least two spring arms connected to its back part, each spring arm extending around a lateral edge of one arcuate permanent magnet.

2. A stator in accordance with claim 1 in which:

the channels in the circumference of the bore have a dove-tail cross-section;

the extensions on the spring element comprise tabs which are punched out of and away from the back part;

each spring arm has an axially extending notch; and each lateral edge of a magnet which is engaged by a spring arm is pointed and lies in the notch.

3. A stator in accordance with claim 1 in which:

the channels in the circumference of the bore have a T-shaped cross-section;

the extensions on the spring element comprise tabs which are punched and bent up out of the back part;

each spring arm has an axially extending notch; and each lateral edge of a magnet which is engaged by a spring arm is pointed and lies in the notch.

* * * * *